J. O. MICHAUD.
AUXILIARY BRAKE FOR AUTOMOBILES.
APPLICATION FILED FEB. 3, 1917.
1,243,960.
Patented Oct. 23, 1917.
2 SHEETS—SHEET 1.
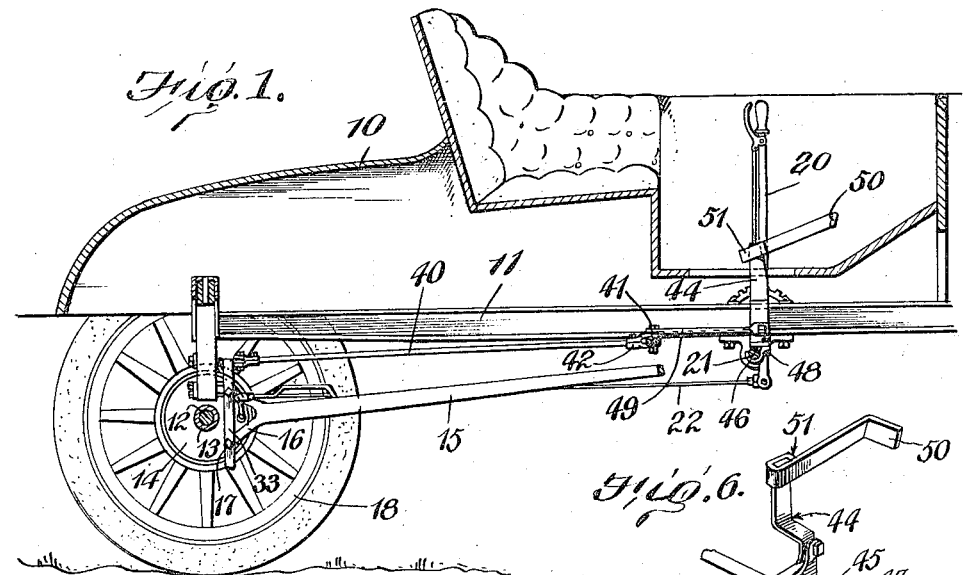
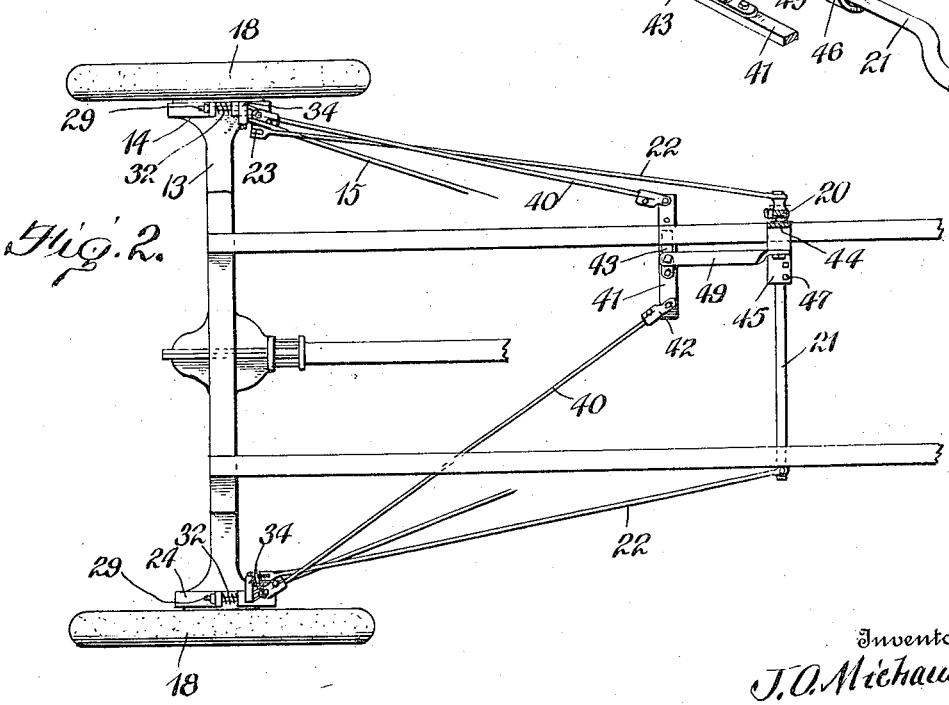
Inventor
J. O. Michaud
By _____, Attorneys

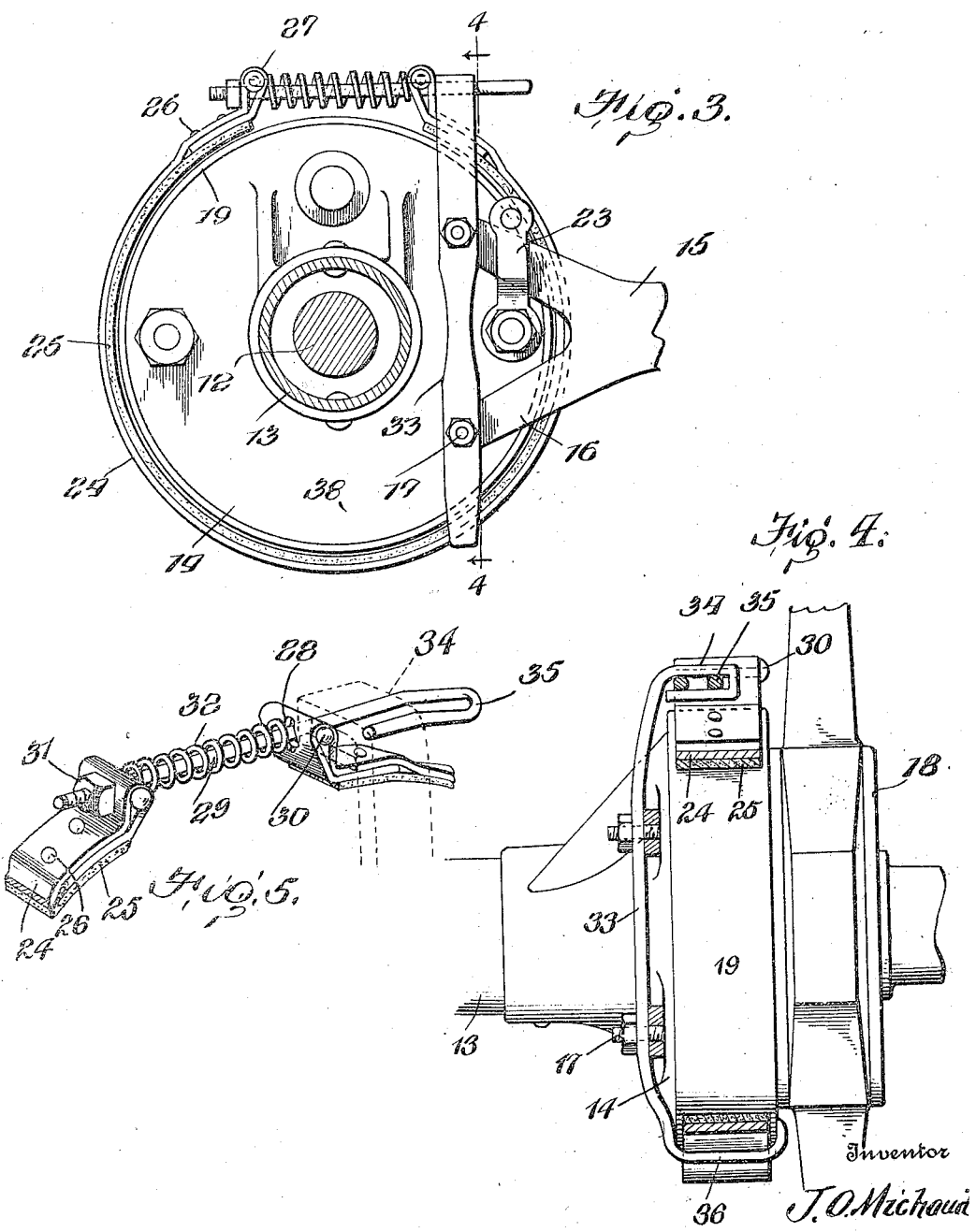

UNITED STATES PATENT OFFICE.

JOSEPH O. MICHAUD, OF FORT KENT, MAINE.

AUXILIARY BRAKE FOR AUTOMOBILES.

1,243,960.  Specification of Letters Patent.  Patented Oct. 23, 1917.

Application filed February 3, 1917. Serial No. 146,481.

*To all whom it may concern:*

Be it known that I, JOSEPH O. MICHAUD, a citizen of the United States, residing at Fort Kent, in the county of Aroostook and State of Maine, have invented certain new and useful Improvements in Auxiliary Brakes for Automobiles, of which the following is a specification.

My invention relates to new and useful improvements in brakes for self-propelled vehicles, the primary object of my invention being the provision of a supplemental brake for Ford automobiles.

More specifically, one of the objects of my invention resides in the provision of a brake for Ford cars which may be readily attached to the car without necessitating the removal of any parts and which will act directly upon the rear wheels thereby taking all strain off the rear axle and differential.

A still further object of my invention resides in providing a brake of this character which will prevent chattering and grinding as the car is being brought to a stop, being noiseless in its action.

In carrying out my invention, I provide brake bands operating about the brake drums of the wheels, and a further object of my invention is to so construct the brake bands and the correlated operating mechanisms that there shall be no right and left parts, any part being applicable to either wheel, as may be desired.

With these and other objects in view, my invention will be more fully described, illustrated in the accompanying drawings, and then specifically pointed out in the claims which are attached to and form a part of this application.

In the drawings:

Figure 1 is a fragmentary sectional view of a Ford automobile, showing my invention applied thereto;

Fig. 2 is a fragmentary plan view of the brake mechanism applied;

Fig. 3 is a sectional view taken through the rear axle, showing one of the brake mechanisms proper;

Fig. 4 is a sectional view taken on the line 4—4 of Fig. 3;

Fig. 5 is a fragmentary perspective view of the connected ends of the resilient brake band forming part of each brake structure;

Fig. 6 is a perspective view of the foot pedal for operating my supplemental brakes.

Corresponding and like parts are referred to in the following description and indicated in all the views of the drawings by the same reference characters.

In order to insure a clear and accurate understanding of my invention I have illustrated it in connection with a Ford automobile, indicated at 10, having the usual frame 11, rear axle 12, rear axle housing tube 13 and rear axle brake band housings 14. The ordinary rear radius rods 15 have their forked terminals 16 secured to this housing by radius rod bolts 17, in the customary manner, and the rear wheels 18 carry the usual brake drums 19. The emergency brake lever 20 is swingingly mounted upon the controller shaft 21 and brake pull rods 22 connect it in the usual manner to the hub brake cam levers 23 by means of which the usual internal expanding brakes are operated.

My invention resides in the provision of an additional pair of brakes of the contracting band type which may be readily applied about the brake drums without necessitating the removal of any of the regular automobile parts and without affecting the operation of any of the brakes now provided. In carrying out this invention, I provide a pair of resilient brake bands 24 having suitable linings 25. These bands are, of course, proportioned to engage loosely about the brake drums of the rear wheels and the free ends of each brake band are doubled upon themselves and riveted or otherwise fastened, as shown at 26, to provide upstanding spaced loops or eyes 27, each of which is slotted, as shown at 28. A draw rod 29 projects through the slots of these eyes and pins or bolts 30 passed through the eyes and bearing over the rod strengthens the eyes. That end of the draw rod engaging in the rear eye is threaded to receive an adjusting nut 31 and a helical spring 32, engaging between the eyes and about the rod, serves to normally hold the brake band in expanded position.

A main supporting bracket 33 is formed with bolt receiving openings in order that it may be secured to the brake drum housings, in the manner shown in Fig. 3, by the same bolts securing the radius rods and at its upper end this bracket is rebent upon itself to provide a horizontally disposed outwardly directed guide loop 34 to receive the free end of the draw rod 29. This end of the draw rod is doubled upon itself to provide an attaching loop 35 having spaced side portions which slide in the guide loop 34 so that the draw rod is held against any turning movement during operation. The lower end of the bracket 33 is provided with an outwardly and upwardly curved terminal 36 forming a support for the lower portion of the brake band when the latter is expanded and also holding the brake band against lateral movement.

Brake pull wires or ropes 40 are adjustably connected to the attaching loops 35 of the pull rods 29 at one end and at their other ends to the ends of an evener bar 41 by clevises 42. This evener bar is slidably supported upon one of the side members of the frame 11 by a bracket 43, as clearly shown in Figs. 2 and 6 of the drawings. A foot pedal 44 has its shank projected downwardly through the bottom or floor of the vehicle in an offset extension of the emergency brake lever slot and terminates in a lateral portion 45 which, with a half bearing portion 46, provides a means for attaching it about the hand lever controller shaft 21, as shown in Fig. 1. Bolts 47 and nuts 48 may be provided for securing the bearing members together and care should be taken that the pedal so mounted is free for turning movement with respect to the controller shaft. A link 49 connects the intermediate portion of this pedal with the evener bar. The intermediate portion of the shank of the foot pedal is offset laterally in order that it may pass through an offset extension of the emergency brake lever slot and a foot pedal proper 50 is provided at its outer side with a rearwardly extending arm terminating in an eye 51 which fits over the upper end of the pedal shank. By this means, the foot piece of the pedal is located within convenient reach of the operator's foot.

In operation, both the usual service brake upon the inner faces of the brake drums may be employed in the usual manner, if desired. However, as a rule, my supplemental brake will be employed for all purposes as it operates directly upon the brake drums carried by the rear wheels and thereby relieves the differential, rear axle and universal joint of all unnecessary strains. As a result, the usual chattering and grinding heard when applying the brakes is prevented and the life and service of the car and safety of its operation is greatly enhanced. Of course, it will be understood that my supplemental brake may be attached directly to the usual service brake pedal, if desired. In fact, I reserve the right to make any changes within the scope of the appended claims without in the slightest degree departing from the spirit of my invention.

Having thus described the invention, what is claimed as new is:—

1. In a supplemental brake for automobiles, a bracket adapted to be secured to a brake drum housing by the bolts fastening the rear radius rod thereto, said bracket at its upper end having a laterally directed loop adapted to project across the brake drum, a resilient brake band adapted to encircle the brake drum, means normally holding the band in expanded position, and means slidably supported by the bracket for supporting the brake band and for drawing the brake band into engagement with the brake drum.

2. In a supplemental brake for automobiles, a bracket adapted for attachment to a brake drum housing and formed with a laterally directed loop adapted to project across the brake drum, a brake band adapted to encircle the brake drum and provided at its ends with substantially radially projecting eyes formed with slots, a draw rod seating in the slots and formed at one end with a draw loop slidable in the loop of the bracket, a nut threaded upon the opposite end of the draw rod, a spring engaging about the draw rod and between the eyes, and reinforcing means passed through the eyes above the draw rod.

3. In a supplemental brake for automobiles, a bracket adapted for attachment to a brake drum housing, a resilient brake band adapted to surround the brake drum, means slidably supported by the bracket for supporting the brake band and for tightening it to bring it into engagement with the brake drum, means normally holding the band in expanded position, and means projecting from the bracket for supporting the lower portion of the brake band and for holding the brake band against lateral movement.

4. In supplemental brakes for automobiles, a pair of brake bands adapted to encircle the brake drums of the rear wheels, brackets adapted for attachment to the brake drum housings, means carried by the brackets for tightening the bands, an evener adapted to be slidably supported upon the frame of the automobile, draw rods connecting the evener with the brake band tightening means, a foot pedal adapted to be mounted for free swinging movement about the hand lever controller shaft of the automobile, and connecting means between the foot pedal and evener.

5. In supplemental brakes for automobiles, a pair of brake bands adapted to encircle the brake drums of the drive wheels, brackets adapted for attachment to the brake drum housings, means carried by the brackets for supporting the brake bands and tightening them, an evener adapted to be slidably supported upon the frame of the automobile, connecting means between the evener and the brake band tightening means, a lever arm adapted for rotatable connection at one end with the hand lever controller shaft of the automobile and to project at its opposite end through the same slot in the floor boards as the hand lever, and a foot pedal having an off-set shank terminating in a loop adapted to engage about the upper end of the lever arm.

In testimony whereof I affix my signature.

JOSEPH O. MICHAUD. [L. S.]

Copies of this patent may be obtained for five cents each, by addressing the "Commissioner of Patents, Washington, D. C."